United States Patent
Houseman et al.

(10) Patent No.: US 6,682,111 B1
(45) Date of Patent: Jan. 27, 2004

(54) IMPACT ABSORBING TRUCK GRILLE GUARD

(75) Inventors: Terrance Lane Houseman, Jetmore, KS (US); Merrill Lee Cauble, Larned, KS (US); Lonnie Ray Martin, II, Halstead, KS (US); Michael Lee McCoy, Wichita, KS (US)

(73) Assignee: Kritter Gitter, Inc., Jetmore, KS (US)

( * ) Notice: Subject to any disclaimer, the term of this patent is extended or adjusted under 35 U.S.C. 154(b) by 0 days.

(21) Appl. No.: 10/194,492

(22) Filed: Jul. 12, 2002

(51) Int. Cl.⁷ .............................................. B60R 19/52
(52) U.S. Cl. ........................ 293/115; 293/145; 293/144
(58) Field of Search ............................ 224/490; 293/38, 293/39, 114, 118, 129, 131, 132, 133, 138, 139, 140, 115, 142, 143, 144, 145, 146, 147, 148, 152, 153, 154, 155; 52/633; D12/171, 170; 166/89.17; 280/770

(56) References Cited

U.S. PATENT DOCUMENTS

| | | | | |
|---|---|---|---|---|
| 1,443,362 A | * | 1/1923 | Heinrich | 293/115 |
| 1,656,026 A | * | 1/1928 | Walter | 293/138 |
| D154,747 S | * | 8/1949 | Bustin | D12/171 |
| 3,282,368 A | * | 11/1966 | Pittera | 293/115 |
| 3,287,027 A | | 11/1966 | Schuckman | |
| 3,749,436 A | | 7/1973 | Hitchcock | |
| 4,099,760 A | | 7/1978 | Mascotte et al. | |
| 4,125,214 A | * | 11/1978 | Penn | 293/117 |
| 4,469,360 A | * | 9/1984 | Drury | 293/144 |
| 4,657,294 A | | 4/1987 | Rumpp | |
| D308,957 S | * | 7/1990 | Bennie | D12/171 |
| 5,067,760 A | | 11/1991 | Moore et al. | |
| 5,636,885 A | * | 6/1997 | Hummel | 293/115 |
| 5,683,128 A | | 11/1997 | Heyns | |
| 6,231,093 B1 | * | 5/2001 | Storer | 293/115 |
| 6,447,032 B1 | * | 9/2002 | Howell, Sr. | 293/115 |

FOREIGN PATENT DOCUMENTS

DE    3518899 A1    11/1986

OTHER PUBLICATIONS

Japanese Patent No. 06305381A issued Jan. 11, 1994 to applicant, Suzuki Motor Corp., inventor Yamaguchi Masaaki.

* cited by examiner

Primary Examiner—Stephen T. Gordon
Assistant Examiner—Jason Morrow
(74) Attorney, Agent, or Firm—Kenneth Jack; Davis & Jac, LLC

(57) ABSTRACT

An impact absorbing truck grille guard having a rear frame consisting of a matrix of triangular tubes, the rear frame having an upper end, a lower end, and a forward end, the forward end of the rear frame defining a forwardly opening deflection space; a front frame having an upper end, a lower end, and a forward animal impact surface, the upper and lower ends of the front frame being respectively fixedly attached to the upper and lower ends of the rear frame, the front frame consisting of a rectangular array of hollow collapsible tubes, the front frame being adapted for, upon animal impact, deflecting rearwardly into the forwardly opening deflection space; and a truck mounting bracket fixedly attached to the lower end of the rear frame, the truck mounting bracket being adapted for fixed attachment to a truck front end and for cantilevered upward extension of the front and rear frames.

9 Claims, 4 Drawing Sheets

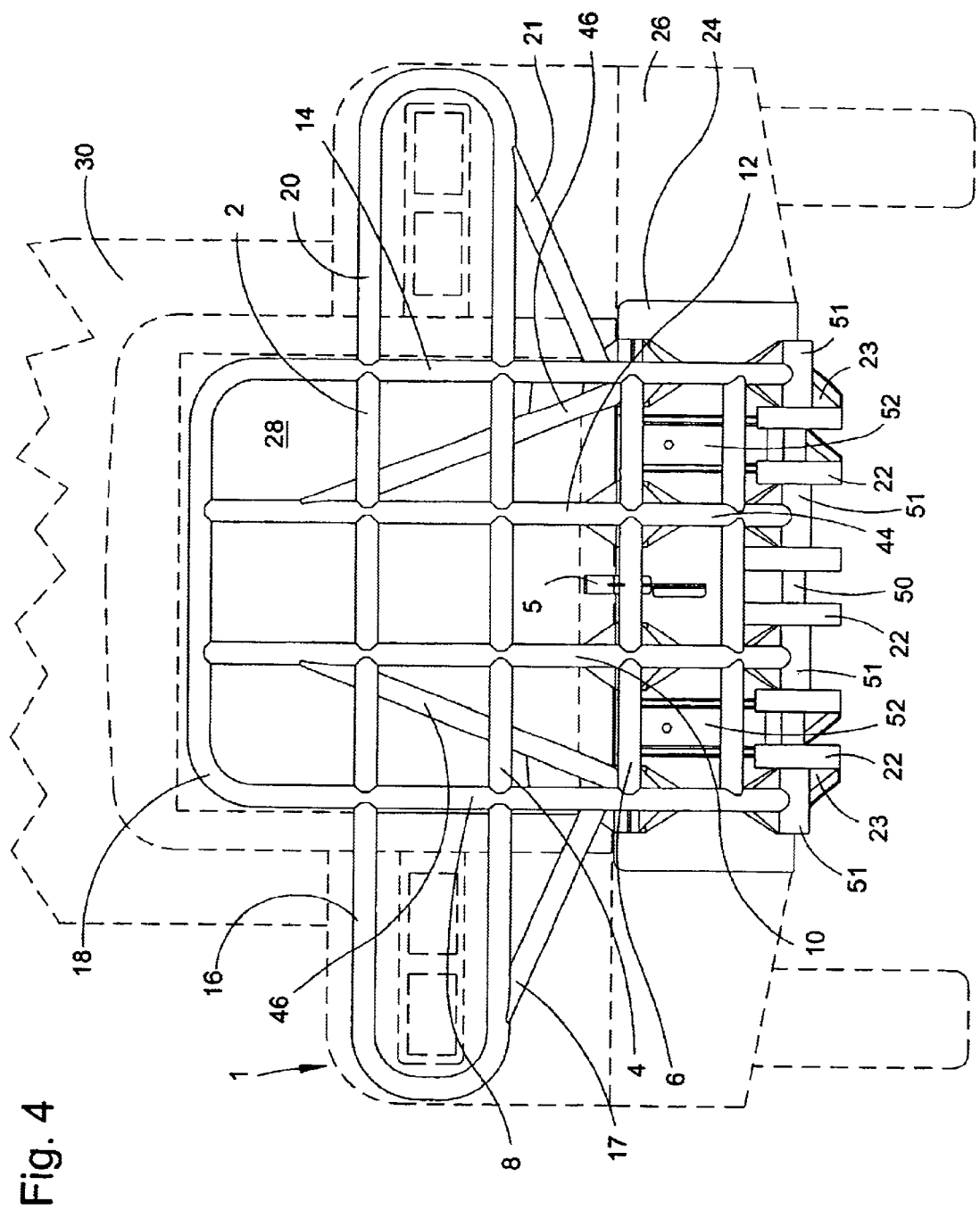

IMPACT ABSORBING TRUCK GRILLE GUARD

CROSS REFERENCE TO RELATED APPLICATIONS

The applicants herein have contemporaneously filed related applications entitled Truck Grille Guard Mounting Bracket and Articulation Controlling Apparatus.

FIELD OF THE INVENTION

This invention relates to highway trucks. More particularly, this invention relates to apparatus for attachment to highway truck front ends, such apparatus being adapted for protecting truck radiator grilles from impacts with animals straying onto highways.

BACKGROUND OF THE INVENTION

A typical truck-tractor pulling a fully loaded trailer at 65 mph needs in excess of 200 feet to stop. As a result of such lengthy stopping distances, truckers who drive at night often fail to see deer standing in the roadway in time to stop short of impact. Upon impact of a truck's front end with a deer, the deer's torso commonly compresses against the truck's radiator grille, driving the grille rearwardly into the truck's radiator. The force of such an impact commonly breaks or ruptures fluid conduits within the radiator. Such radiator damage typically disables the truck from operation, resulting in expensive repairs and economically wasteful and expensive shipment delays and spoilage of perishable cargo. It is, therefore, desirable to provide a guard structure which is attachable to such truck which is adapted for protecting its radiator grille and its rearwardly lying radiator from damage.

Truck radiator grilles and radiators are difficultly protected because truck engine cowls or hoods are typically constructed of lightweight material and open by pivoting forwardly. The lightweight construction of common truck engine cowls makes them inappropriate structures for mounting support of radiator protecting frames and the like. Bumper structures provide firmer mounting support. However, mounting of protective frames upon truck bumper structures is complicated by the common forward pivoting motion of truck engine cowls. Truck grille guards which mount upon bumper structures and which extend upwardly across the truck radiator grille in a cantilevered fashion tend to undesirably lever against bumper structures upon impact with a deer, resulting in damage both to the bumper structures and to the radiator grille.

The instant inventive impact absorbing grille guard overcomes difficulties outlined above by providing an impact protecting grille guarding structure having a rear supporting frame, a front collapsible frame, by providing frame articulating means, and by providing mounting means which dually engages bumper structures and rearwardly lying truck chassis and wheel support structures.

BRIEF SUMMARY OF THE INVENTION

The central or primary structural component of the instant inventive impact absorbing truck grille guard comprises a rear frame. Preferably the rear frame has a lateral dimension which allows it to co-extensively overlie the lateral width of a common truck radiator grille. Preferably, the vertical dimension of the rear frame is fitted and positioned so that its upper and lower ends may respectively overlie and underlie the torso or main body mass of a standing deer. Necessarily, forward surfaces of the rear frame define a forwardly opening deflection space. For purposes of achieving a high ratio of structural strength to weight, the rear frame preferably comprises a triangulating matrix of hollow bored steel bars or tubes. Suitably, though less desirably, the rear frame may comprise solid metal bar members.

A front frame is necessarily fixedly attached to the rear frame, the front frame preferably being positioned so that it spans and covers the rear frame's deflection space both vertically and laterally. Preferably, the front frame comprises a rectangular array or grid of steel tubes which are capable of, upon impact with an animal such as a deer, both plastically deflecting rearwardly into the deflection space, and plastically internally collapsing in reduction of each tube's longitudinal or front to rear dimension. The preferred capacity of the front frame for plastic deformation into the deflection space, and for plastic internal deformation beneficially spreads instantaneous impact forces over the transit time associated with the longitudinal deformation distance. Such deformability also beneficially converts a portion of the kinetic energy associated with an impact into heat, desirably reducing the magnitude of rebound forces experienced by the grille guard. Suitably, though less desirably, the web of the front frame may be configured other than rectangularly, and may comprise solid bar members rather than the preferred hollow tubular bars.

In addition to the front frame's capacity for impact absorbing deformation, the rear frame is also preferably fabricated to have a capacity for slight elastic rearward deformation upon impact, such elastic deformation further reducing the magnitude of instantaneous forces applied to a truck upon impact with a deer.

Truck mounting means integral with and extending downwardly from the lower end of the rear frame are necessarily provided. Such means are necessarily capable of upwardly cantilevering the front and rear frames from a truck's bumper area to overlie and protect a truck's radiator grille cover. Preferably, the truck mounting means comprises a laterally elongated clevis whose front arm is preferably configured as a bumper mounting plate, and whose rear arm is preferably configured as a plurality of rearwardly extending arms, the distal end of each such arm preferably being adapted for fixed mounting upon the truck's chassis members, spring hangers, or central tow hook arm. Preferably, a plurality of such rearwardly extending arms are themselves configured as left and right clevis arms for nesting receipt of and fixed attachment to truck chassis members or spring hangers. By fixedly mounting the preferred forward mounting plate of such laterally extending clevis upon the forward surface of a truck's bumper, and by fixedly mounting distal ends of the rearwardly extending arms of such clevis to chassis members, spring hangers, or to the central tow hook arm of such truck, firm base support for cantilevered extension of the rear and front frames of the grille guard is provided.

Preferably, an articulating joint interconnects an extreme lower end of the rear frame with the forward surface of the mounting plate, such joint allowing the front and rear frames to pivot between their upwardly cantilevered impact absorbing position and a forwardly extending position which facilitates opening of the truck's engine cowl. Preferably, such articulating joint comprises a plurality of common pin, eye, and clevis joints, the eyes preferably comprising sleeves which are integral with the extreme lower end of the rear frame, and the arms of the devises preferably being integral with the proximal ends of the rearwardly extending arms of the laterally extending clevis.

Accordingly, it is an object of the present invention to provide a protective structure attachable to truck front ends which is capable of protecting truck radiator grilles from impact with animals such as deer.

It is a further object of the present invention to provide such a structure which achieves a high strength to weight ratio by utilizing tubular steel welded into a semi-rigid frame.

It is a further object of the present invention to provide such a structure which is adapted for rearwardly directed impact absorbing deformations and deflections.

It is a further object of the present invention to provide a structure which upwardly cantilevers a grille guard, and which is capable of grille guard articulation, allowing for truck engine cowl opening and engine access.

It is a further object of the present invention to provide such a structure which incorporates a laterally extending clevis for secure mounting upon truck chassis, spring hanger, tow hook arm, and bumper structures.

Other and further objects, benefits, and advantages of the present invention will become known to those skilled in the art upon review of the Detailed Description which follows, and upon review of the appended drawings.

BRIEF DESCRIPTION OF THE DRAWINGS

FIG. 4 is a front view of the instant inventive truck grille guard.

DETAILED DESCRIPTION OF A PREFERRED EMBODIMENT

Figure 1:
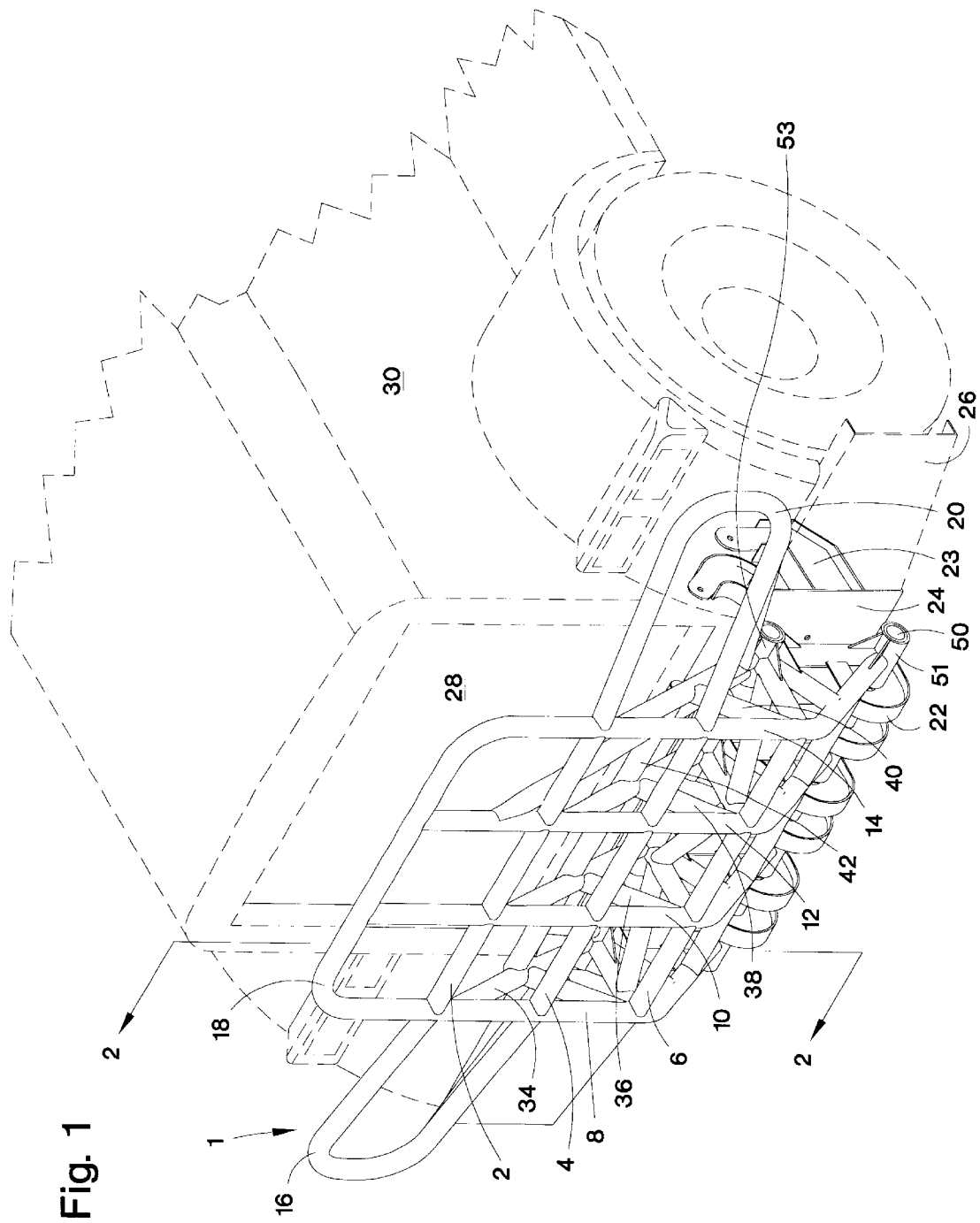
FIG. 1 is an isometric view of the instant inventive impact absorbing truck grille guard.

Referring now to the drawings, and in particular to FIG. 1, the instant inventive impact absorbing truck grille guard is referred to generally by Reference Arrow 1. A primary or core structural component of the truck grille guard comprises a rear frame preferably consisting of a plurality of forwardly opening "V" bars 34, 36, 38 and 40, the rearward vertices of said bars being interconnected by crossbar 42, and the upper and lower distal ends of the legs of such "V" bars preferably being respectively interconnected by crossbars 2 and 6. Said rear frame comprising bars 2, 6, 34, 36, 38, 40, and 42, beneficially defines a forwardly opening deflection space between the legs of the "V" bars. Preferably, the vertical dimension of such deflection space is sufficient for receipt of a torso of a deer, and preferably, referring to FIG. 4, the lateral dimension of such rearward frame is sufficient to overlie and protect a common truck radiator grille 28.

Referring further to FIG. 1, a front frame preferably consisting of a matching plurality of vertical bars 8, 10, 12, and 14, and crossbar 4 spans between and interconnects upper and lower ends of the rear frame.

Figure 2:
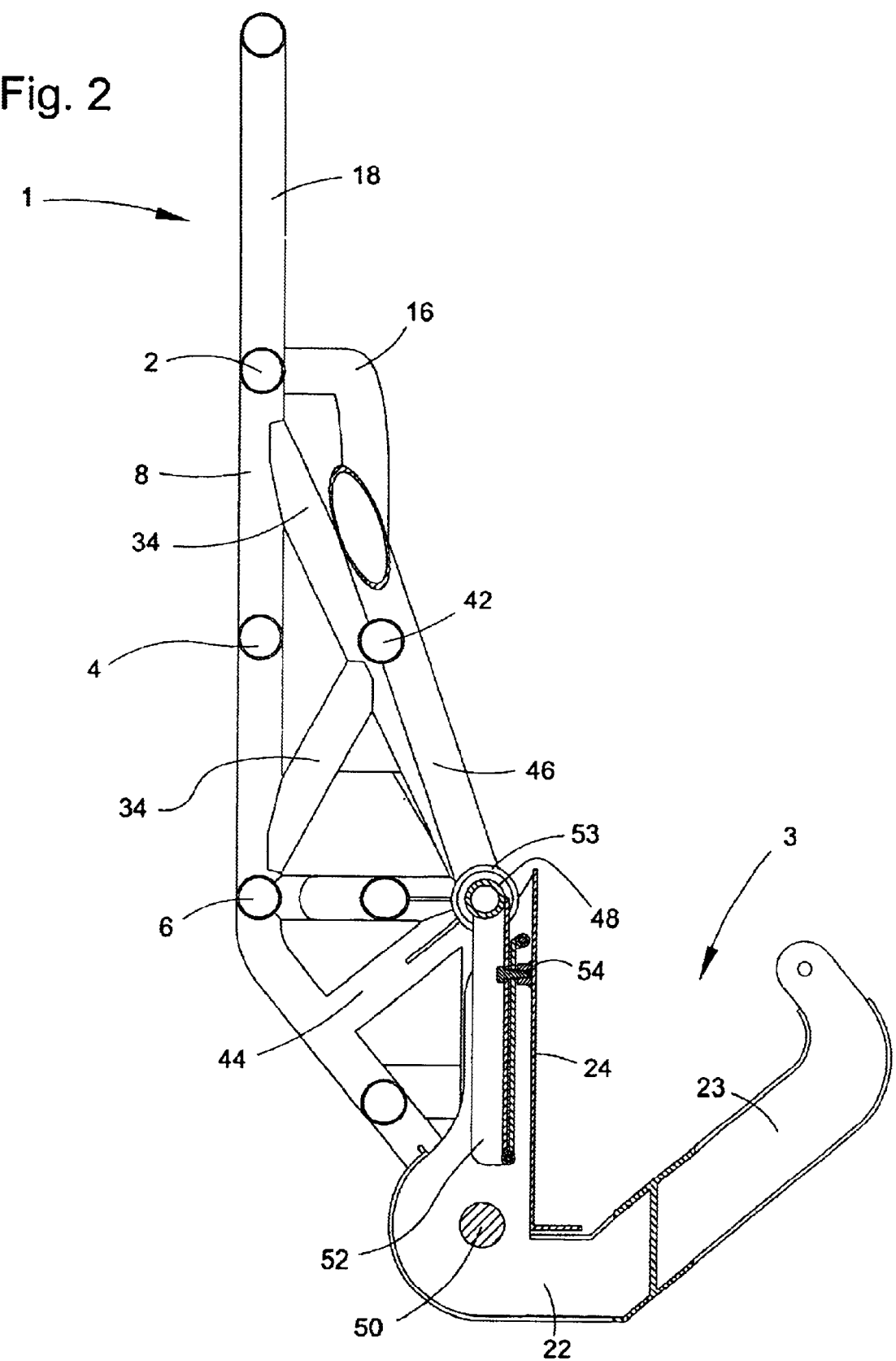
FIG. 2 is a sectional view as indicated in FIG. 1.
Figure 3:
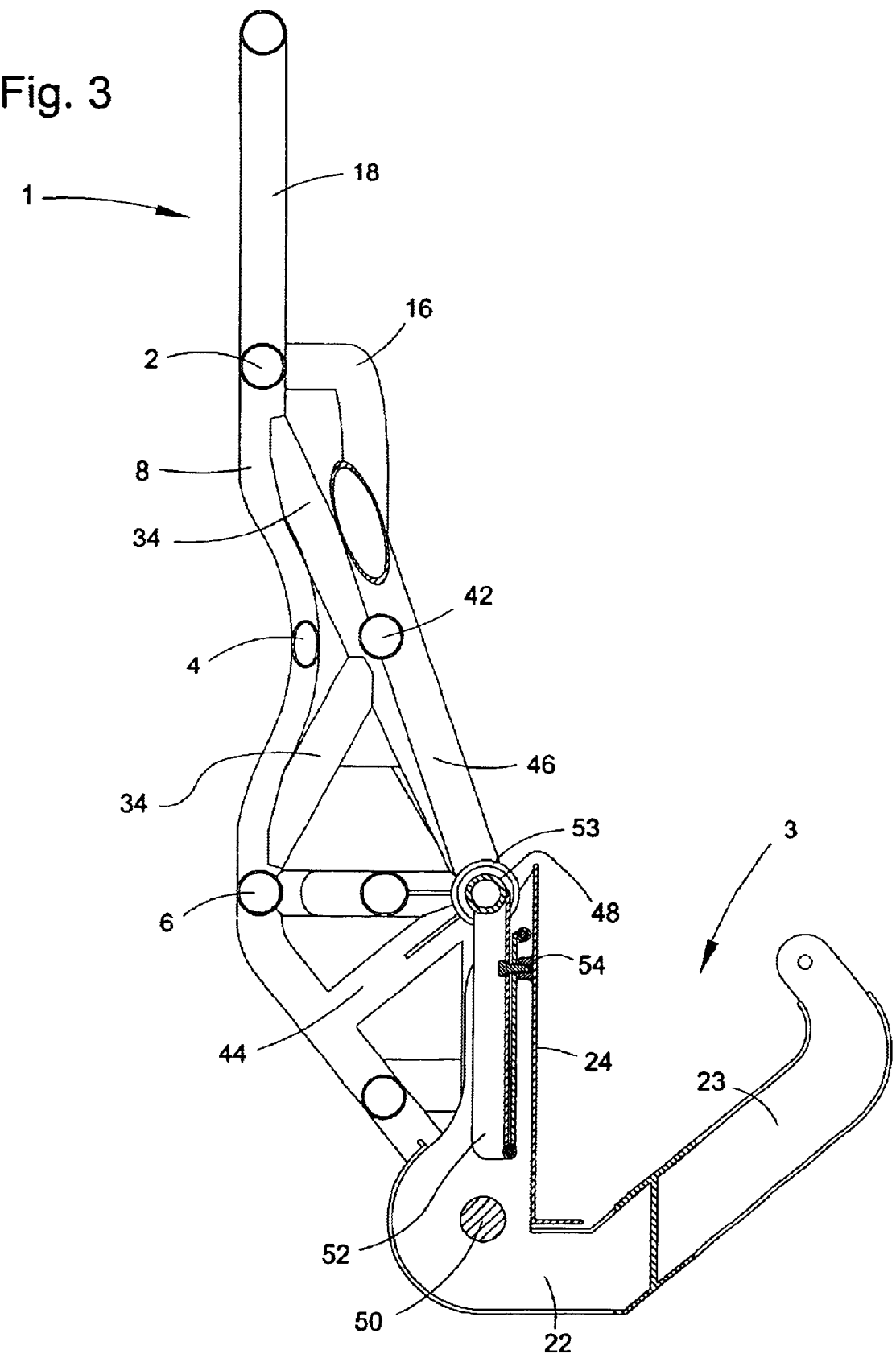
FIG. 3 redepicts FIG. 2 showing deformation and deflection resulting from an impact.

Referring simultaneously to FIGS. 2 and 3, upon impact of forward surfaces of the front frame with a deer, the front frame deflects rearwardly into the rear frame's deflection space as depicted in FIG. 3. Bars 4, 8, 10, 12, and 14 also preferably comprise hollow metal tubes, allowing them to inwardly collapse and deform upon such impact as depicted in FIG. 3, further absorbing such impact with a deer.

Referring again to FIG. 1, "U" bars 16, 18, and 20 preferably extend laterally and upwardly providing further protection of the truck engine's cowl and fender structures 30. Referring to FIG. 4, "U" bars 16 and 20 are preferably reinforced by triangulating bases 17 and 21.

Referring to FIG. 2, truck mounting means are necessarily provided, such means preferably comprising a triangulating matrix of tubular bars 44 and 46, such matrix extending downwardly from the lower end of the rear frame, and comprising the laterally extending clevis joint referred to generally by Reference Arrow 3. The forward arm of the laterally extending clevis 3 preferably comprises a mounting plate 24 which is preferably bolted directly to, referring to FIG. 1, the front surface of the truck's bumper 26. The rearward arm of the laterally extending clevis 3 preferably comprises a plurality of, and preferably six, rearwardly extending arms 23, the distal ends of said arms being adapted for fixed attachment to truck chassis members, truck spring hangers, or to a truck's central tow hook arm. Preferably, left and right pairs of such rearwardly extending arms of the rear arm of the laterally extending clevis 3 themselves are configured as left and right clevis arms for nesting receipt of and secure attachment to truck spring hangers or chassis members.

Referring simultaneously to FIGS. 2 and 4, the preferred truck mounting means preferably comprises a plurality of, and preferably three, articulating pin, eye, and clevis joints. The eyes of such joints are preferably configured as pin receiving sleeves 51, which are integral with the extreme lower end of the rear frame. The clevis members of such joints preferably comprise a plurality of ears 22, the ears 22 preferably extending and forwardly from the forward surface of mounting plate 24. A clevis pin or hinge pin 50 extends laterally through pin receiving spaces 51 and ears 22, facilitating articulating or pivoting motion of the front and rear frames between the depicted upwardly cantilevered position for impact absorption, and a downwardly pivoted position allowing facilitating opening by forward pivoting of engine cowl 30. For purposes of enhanced structural strength, ears 22 are preferably formed integrally with rearwardly extending arms 23.

Referring simultaneously to FIGS. 2 and 4, articulating pivot stopping guys or arms 52 span between and interconnect the mounting plate 24, and the rear frame. Preferably, a lock bolt 54 secures such arm 52 in its upwardly retracted position. Upon release of lock bolt 54, the forward and rearward frames pivot about axle 50, while axles 48 pivot within sleeves 53, resulting in outward and downward articulating motion of arm 52. Upon full extension of arm 52, pivoting motion of the forward and rear frames is stopped at a substantially horizontal cantilevered position, allowing articulating arm 52 to serve as suspending guy.

Referring simultaneously to FIGS. 2 and 4, a manually releaseable latch 5 is preferably provided, such latch functioning to secure the forward and rear frames in their upwardly cantilever position, while lock bolts 54 are manipulated.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

We claim:

1. An impact absorbing truck grille guard comprising:
   (a) a rear frame having an upper end, a lower end, and a forward end, the forward end of the rear frame defining a forwardly opening deflection space;
   (b) a front frame comprising a web of bars and having an upper end, a lower end, and a forward animal impact surface, the upper and lower ends of the front frame being respectively fixedly attached to the upper and lower ends of the rear frame, the front frame being capable of deflecting rearwardly into the forwardly opening deflection space; and
   (c) truck mounting means fixedly attached to the lower end of the rear frame and being capable of upwardly cantilevering the rear and front frames, the rear frame being capable of deflecting rearwardly; each bar among the web of bars comprising a hollow tube, each tube having front and rear surfaces, each tube having a longitudinal dimension extending from its front surface to its rear surface, each tube being capable of deformation upon impact, shortening said dimension.

2. The impact absorbing truck grille guard of claim 1 wherein the web comprises a rectangular array.

3. An impact absorbing truck grille guard comprising:
   (a) a rear frame having an upper end, a lower end, and a forward end, the forward end of the rear frame defining a forwardly opening deflection space;
   (b) a front frame comprising a web of bars and having an upper end, a lower end, and a forward animal impact surface, the upper and lower ends of the front frame being respectively fixedly attached to the upper and lower ends of the rear frame, the front frame being capable of deflecting rearwardly into the forwardly opening deflection space; and
   (c) truck mounting means fixedly attached to the lower end of the rear frame and being capable of upwardly cantilevering the rear and front frames, the rear frame being capable of deflecting rearwardly; the truck mounting means comprising an articulating joint capable of facilitating pivoting motion of the rear and front frames between the upwardly cantilevered position and a substantially horizontal engine cowl opening position.

4. An impact absorbing truck grille guard comprising:
   (a) a rear frame having an upper end, a lower end, and a forward end, the forward end of the rear frame defining a forwardly opening deflection space;
   (b) a front frame having an upper end, a lower end, and a forward animal impact surface, the upper and lower ends of the front frame being respectively fixedly attached to the upper and lower ends of the rear frame, the front frame being capable of deflecting rearwardly into the forwardly opening deflection space; and
   (c) truck mounting means fixedly attached to the lower end of the rear frame, the truck mounting means comprising a laterally extending clevis having a front arm and a rear arm, the front arm of the laterally extending clevis being adapted for fixed attachment to truck bumpers, the rear arm of the laterally extending clevis being adapted for fixed attachment to truck spring hangers, truck chassis members, or to truck tow hook arms.

5. The impact absorbing truck grille guard of claim 4 wherein the front arm of the laterally extending clevis comprises a mounting plate.

6. The impact absorbing truck grille guard of claim 5 wherein the rear arm of the laterally extending clevis comprises a plurality of left and right clevis arms, said arms being adapted for nesting receipt of truck spring hangers or truck chassis members.

7. The impact absorbing truck grille guard of claim 6 wherein the rear frame comprises a matrix of triangulating tubes.

8. The impact absorbing truck grille guard of claim 7 further comprising pivot stopping guy spanning between and being operatively connected to the rear frame and the mounting plate.

9. The impact absorbing truck grille guard of claim 8 further comprising a manually releaseable safety latch fixedly attached to the plate, said latch being adapted for securing the front and rear frames in their upwardly cantilevered position.

* * * * *